US011676051B2

(12) United States Patent
Sodhi et al.

(10) Patent No.: US 11,676,051 B2
(45) Date of Patent: Jun. 13, 2023

(54) PREDICT SOLUTIONS FOR POTENTIAL HAZARDS OF STORED ENERGY (71) Applicant: International Business Machines Corporation, Armonk, NY (US)

(72) Inventors: Manjit Singh Sodhi, Bangalore (IN); Sarbajit K. Rakshit, Kolkata (IN); Rahul Jain, Kolkata (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 16/936,486

(22) Filed: Jul. 23, 2020

(65) Prior Publication Data
US 2022/0027752 A1 Jan. 27, 2022

(51) Int. Cl.
*G06Q 30/00* (2023.01)
*G06N 5/04* (2023.01)
(Continued)

(52) U.S. Cl.
CPC ............ *G06N 5/04* (2013.01); *G01V 1/008* (2013.01); *G06N 20/00* (2019.01); *G06Q 40/08* (2013.01); *G16Y 40/20* (2020.01)

(58) Field of Classification Search
None
See application file for complete search history.

(56) References Cited

U.S. PATENT DOCUMENTS 8,494,827 B2 7/2013 Mutlu et al.
10,353,012 B2 7/2019 Roumi et al.
(Continued)

FOREIGN PATENT DOCUMENTS

CN 104533443 A 4/2015
CN 109639762 A * 4/2019 ........... H04L 41/044
(Continued)

OTHER PUBLICATIONS

"Tilt Sensors & Inclinometers" TE Connectivity, Printed Mar. 13, 2020, 3 pages https://www.te.com/usa-en/products/sensors/position-sensors/tilt-sensorsinclinometers.html?tab=pgp-story.
(Continued)

*Primary Examiner* — Matthew T Sittner
(74) *Attorney, Agent, or Firm* — Rachel M. Yadlosky (57) ABSTRACT A method, system, and computer program product for simulating potential consequences and possible solutions due to a release of stored energy using augmented reality. The method may include aggregating IoT feeds from devices in a surrounding area. The method may also include calculating amounts of stored energy in the surrounding area based on the IoT feeds. The method may also include predicting contextual situations that could result due to a release of the stored energy in the surrounding area. The method may also include determining one or more consequences for each of the contextual situations. The method may also include calculating a degree of severity of the one or more consequences for each contextual situation. The method may also include determining one or more proposed solutions based on the degree of severity. The method may also include transmitting a recommendation of at least one proposed solution for implementation.

20 Claims, 5 Drawing Sheets (51) Int. Cl.
*G06Q 40/08* (2012.01)
*G01V 1/00* (2006.01)
*G06N 20/00* (2019.01)
*G16Y 40/20* (2020.01)

(56) References Cited

U.S. PATENT DOCUMENTS

| | | | |
|---|---|---|---|
| 2003/0210228 | A1 | 11/2003 | Ebersole |
| 2012/0046917 | A1 | 2/2012 | Fang et al. |
| 2017/0147021 | A1* | 5/2017 | Wu .................. G05B 15/02 |
| 2017/0178013 | A1 | 6/2017 | Beloglazov et al. |
| 2017/0293705 | A1 | 10/2017 | Van der Velden et al. |
| 2020/0334577 | A1* | 10/2020 | Anderson ............ G06Q 10/063 |

FOREIGN PATENT DOCUMENTS

| | | |
|---|---|---|
| CN | 109639762 A | 4/2019 |
| CN | 110322133 A | 10/2019 |
| CN | 110782722 A | 2/2020 |

OTHER PUBLICATIONS

"Lab 4—Conservation of Mechanical Energy," WebAssign, Labs for College Physics Mechanics, 2010, 10 pages https://webassign.net/labsgraceperiod/ncsulcpmech2/lab_4/manual.html.

"Potential energy," Wikipedia The Free Encyclopedia, Printed Jan. 2, 2020, 15 pages https://en.wikipedia.org/wiki/Potential_energy.

What is Stored Energy?, WellSite Permit to Work, Nov. 4, 2018, 5 pages https://wellsite.org.au/what-is-stored-energy/.

"Four Common Warehouse Accidents and Steps to Prevent Them," MSDSonline, Sep. 21, 2016, 8 pages https://www.msdsonline.com/2016/09/21/four-common-warehouse-accidentsand-steps-to-prevent-them/.

Nelson, "Earthquake Prediction, Control and Mitigation," Tulane University, EENS 3050 Natural Disasters, Last Updated Sep. 16, 2016, 9 pages, https://www.tulane.edu/~sanelson/Natural_Disasters/eqprediction&cntrl.htm.

Davie et al., "Investigation of a continuum damage model as an indicator for the prediction of spalling in fire exposed concrete," Elsevier, Computers and Structures, 2011, 16 pages https://www.sciencedirect.com/science/article/pii/S0045794911003002.

* cited by examiner

PREDICT SOLUTIONS FOR POTENTIAL HAZARDS OF STORED ENERGY

BACKGROUND

The present disclosure relates to augmented reality, and more specifically to simulating potential consequences and possible solutions due to a release of stored energy using augmented reality.

Stored energy is energy that is held, or possessed, by an object. There may be different forms of stored energy, including gravitational potential energy (for instance, energy stored in an object as a result of the object's position or height), mechanical energy (for instance, energy stored in objects as a result of the application of a force), electrical energy (for instance, energy stored in an object as a result of the movement of electrons through—or to—the object), energy stored in pressurized gases and/or liquids, etc. Stored energy may exist everywhere, including in areas that may not be expected. For example, stored energy may be all over various working environments including areas with cables or wireline reels under tension, drill string under torque, compressed springs, wellheads/tanks/pipelines under pressure, objects carried/lifted/elevated above the ground, etc.

SUMMARY

The present disclosure provides a computer-implemented method, system, and computer program product to simulate potential consequences and possible solutions due to a release of stored energy using augmented reality. The method may include aggregating IoT feeds from one or more devices in a surrounding area. The method may also include calculating amounts of stored energy in the surrounding area based on the IoT feeds. The method may also include predicting one or more contextual situations that could result due to a release of the stored energy in the surrounding area. The method may also include determining one or more consequences for each of the one or more contextual situations, where the one or more consequences are caused by the one or more contextual situations. The method may also include calculating a degree of severity of the one or more consequences for each of the one or more contextual situations. The method may also include determining one or more proposed solutions based on the degree of severity. The method may also include transmitting a recommendation of at least one proposed solution, from the one or more proposed solutions, for implementation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to augmented reality, and more specifically to simulating potential consequences and possible solutions due to a release of stored energy using augmented reality. While the present disclosure is not necessarily limited to such applications, various aspects of the disclosure may be appreciated through a discussion of various examples using this context.

Stored energy may be accumulated, and as the energy accumulates it may become more and more likely to release suddenly, potentially causing serious dangers or consequences. For example, as a spring becomes increasingly compressed or stretched, stored energy continues to build and accumulate. Eventually, the stored energy may accumulate to a point that the spring suddenly expands, releasing the stored energy with a large force. In another example, rocks—particularly rocks that are part of fault surfaces—may continue to accumulate energy as the fault surfaces continue to shift and cause frictional resistance. The friction may continue to cause a buildup of stored energy until eventually the stored energy suddenly releases, causing an earthquake. The dangers caused by the sudden release of stored energy may include damage to property as well as harm to human beings, such as serious injury or even death.

Conventionally, various technologies, such as Internet of Things (IoT), may be used to track and/or calculate stored energy in the environment. IoT technology may enable information to be transferred to various computing devices without any human interaction. Therefore IoT devices, and potentially even image scanning techniques, may be used to determine how much stored energy there is in an area. However, once it is determined how much stored energy has accumulated, it may be up to humans to determine how to address the issue. If this issue is not addressed, the sudden release of the stored energy may cause accidents and/or damage in the area of the sudden release of energy.

The present disclosure provides a computer-implemented method, system, and computer program product to simulate potential consequences and possible solutions due to a release of stored energy using augmented reality. Through the use of augmented reality (AR), along with IoT and artificial intelligence (AI), not only can the amounts of stored energy in the surrounding be determined, but the stored energy may be analyzed in order to automatically predict the potential consequences due to a release of the stored energy and the possible solutions in order to prevent the consequences from occurring (or at least decreasing the severity of the consequences). Using the combination of AR, IoT, and AI may increase the accuracy of determining and analyzing amounts of stored energy in a surrounding area—because a more accurate and complete visual of the surrounding area may be achieved (helping get better data readings for the surrounding area) and continuous learning and training may be used to constantly improve the algorithms and calculations—and may also allow for the potential consequences and the possible solutions to be accurately predicted automatically, without needing human interference.

The surrounding area, as referred to herein, may include an area or environment that the various IoT devices and AR devices can gather data from. In some instances, the surrounding area is the area that is visible by an AR device. Augmented reality (AR) may include a composite view of a computer-generated image on a view of the surrounding area (e.g., real world environment). Although the Specification discusses AR, virtual reality (VR) technology may also be used, in some embodiments.

In some embodiments, further discussed herein, AR may be used (leveraging AI and IoT) to derive a simulation of the consequences of a release (for instance a sudden release) of the stored energies in the surrounding by executing one or more contextual solutions (such as test cases), via augmented reality, that might result in accidents or consequences due to the release of energy. The stored energy may be calculated by aggregating data feeds from various IoT sensors in a surrounding areas. In some instances, possible solutions in order to prevent the consequences shown in various contextual solutions may be determined and communicated with a user. By predicting consequences of the release of energy (using the contextual solutions) and generating possible solutions, the consequences of a release in stored energy may be minimized or even eliminated, potentially preventing numerous damages in the surrounding area and potential harm to individuals.

Figure 1:
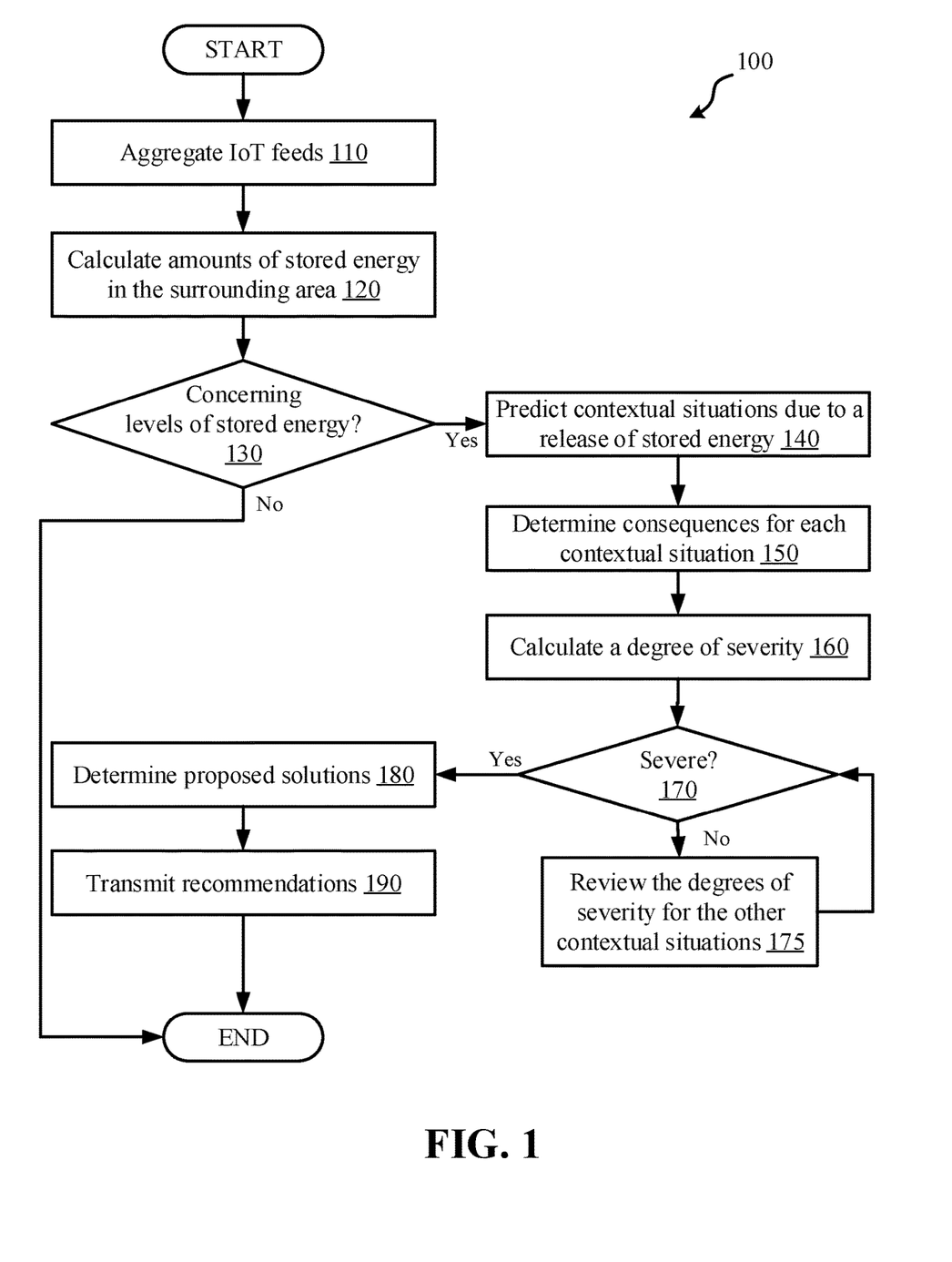
FIG. 1 depicts a flowchart of a set of operations for predicting potential solutions for consequences due to a release of energy, according to some embodiments.

Referring now to FIG. 1, a flowchart illustrating a method 100 for predicting potential solutions for consequences due to a release of energy is depicted, according to some embodiments. In some embodiments, method 100 is executed by a server (e.g., computer system/server 502 (FIG. 5) on, or connected to, an augmented reality device (e.g., AR device 230 (FIG. 2), AR device 330 (FIG. 3), or AR device 410 (FIG. 4)). In some embodiments, the method 100 is implemented as a computer script or computer program (e.g., computer executable code) to be executed on or connected to a computer system (e.g., system 200 (FIG. 2), system 300 (FIG. 3), and/or computer system 500 (FIG. 5)). In some embodiments, the computer system is on or connected to the AR device (and may further be on or connected to an AI system and/or IoT system).

Method 100 includes operation 110 to aggregate IoT feeds from one or more devices in a surrounding area. Various devices with IoT capabilities (i.e., IoT devices) may be located in a surrounding area and/or a vicinity. In some instances, IoT devices may include sensors. For example, a warehouse may have sensors placed throughout (for example, at the ends of the isles) and these sensors may be IoT devices and/or may be pre-linked to IoT devices. In another example, various sensors and/or devices with sensors may be placed near a fault surface in the environment in order to gather various data about the faults. In yet another example, the sensors may be a component of an augmented reality device (e.g., AR glasses or any other portable device with AR capabilities) and the sensors may gather data using the capabilities of the AR device (for example, video capabilities). In some embodiments, the one or more IoT feeds are received from an augmented reality device.

The data gathered from the one or more sensors and IoT devices may be transmitted, or fed, to the system. In some embodiments, the sensors and IoT devices are a component of the system. In some embodiments, the sensors and IoT devices are on or connected to an augmented reality device, and the augmented reality device transmits the IoT feeds to the system. Once the system receives the one or more IoT feeds from the one or more devices, the one or more IoT feeds may be analyzed. In some embodiments, analyzing the one or more IoT feeds includes identifying which data was collected from the IoT devices/sensors and determining which data from the IoT feeds is energy data. In some embodiments, the IoT feeds may be analyzed using video and image analysis techniques.

Energy data may be any data necessary, or even useful, in determining the stored energy in the surrounding area. For example, geological data, environmental data, population distribution data, infrastructure setup data, etc. may be used in determining the stored energy in a surrounding area. In some instances, the stored energy in a surrounding area may correspond to an object that is in motion (e.g., a spring being compressed, a swing that is swinging, a fault surface that is shifting, etc.). In those instances, data relating to the speed of the object, the height of the object, the proximity of the object to other things in the surrounding area, etc. may be used in order to help determine the stored energy.

In some embodiments, aggregating the IoT feeds further includes collecting the energy data from the one or more IoT feeds. The energy data from one IoT feed may be combined, or correlated with, energy data from other IoT feeds in the one or more IoT feeds in order to streamline the aggregation, in some embodiments.

Method 100 includes operation 120 to calculate the amounts of stored energy in the surrounding area based on the IoT feeds. Once the IoT feeds are aggregated, and in some instances the energy data identified and collected from the IoT feeds, the IoT feed data and/or the energy data may be used to calculate the amounts of stored energy in the surrounding area. In some embodiments, calculating amounts of stored energy in the surrounding area may include identifying one or more objects in the surrounding area and calculating an amount of stored energy for each object. An object may be anything material that can be seen and touched (or discerned by the senses).

In some embodiments, machine learning (e.g., supervised learning) may be used to calculate the amounts of stored energy. Supervised learning, a type of machine learning, may pair an input to an output and determine functions or algorithms using mappings of various input-output pairs. Supervised learning may analyze training data of input-outputs and learn/train the algorithm based on the data. Using machine learning techniques, such as supervised learning, an algorithm may be developed (i.e., learned and trained) using various input-output pairs of IoT feed data such as energy data (as the input) and an amount of stored energy (as the output). In some embodiments, the IoT feed data (e.g., energy data) used as an input may be specific to a certain object in the surrounding area, in order to determine, or calculate, an amount of stored energy relating to the certain object.

In some embodiments, the system includes or is connected to a knowledge corpus, and data gathered from the knowledge corpus is used as learning data in order to train the algorithm using machine learning. The knowledge corpus may include historical, or past, data relating to objects in a surrounding area and historical amounts of stored energy corresponding to the objects.

In some embodiments, as depicted in FIG. 1, method 100 proceeds from operation 120 to operation 130 to determine whether there are concerning levels of stored energy. Determining whether there are concerning levels of stored energy, before determining the consequences of a release of the stored energy, may help increase, or improve, the efficiency of predicting potential solutions (for consequences due to a release of energy). In some instances, not every occasion of stored energy in the surrounding area may be used when determining consequences of a sudden release of the stored energy. In some embodiments, if the stored energy is at a lower, or less concerning, level the consequences of a release (e.g., a sudden release) may not need to be determined as they may not have much, if any, dangers or consequences that result from the release.

Determining whether there are concerning levels of stored energy may include determining a threshold value (or, in some instances, level) of stored energy levels for the surrounding area. In some embodiments, each object in the surrounding area may have a threshold value of stored energy levels. The threshold value, in some embodiments, may be learned through machine learning, such as supervised learning and/or reinforcement learning. Reinforcement learning, another type of machine learning, may analyze data to determine which suitable actions may be taken in order to maximize rewards/outcomes. Reinforcement learning may focus on finding a best path for the specific situation (for example, out of numerous 'correct' paths), instead of finding one correct answer based on an input.

In some embodiments, using machine learning, it may be determined how much stored energy (for example, a level or an amount of stored energy) has the potential to cause damages or harm when released. For instance, a knowledge corpus may have data relating to past stored energy releases for objects, or at least objects very similar to those, in the surrounding area. For example, there may be data about fault surfaces, stored energy releases, and earthquakes stored in a knowledge corpus. This data may be used to determine a threshold amount of stored energy for a fault surface that may cause an earthquake. In another example, an object in the surrounding area may include a forklift in a warehouse, and the knowledge corpus may include historical data about forklifts, forklift heights, objects falling off of a forklift, etc. In this example, machine learning may be used in order to determine a threshold amount of stored energy that may cause damages (such as an object to fall off of a forklift).

In some embodiments, determining whether there are concerning levels of stored energy may further include comparing the calculated amount(s) of stored energy to the threshold value of stored energy. The stored energy and the threshold value of stored energy may correspond to an object, in some instances.

For example, continuing the forklift example from above, a forklift may have a box on it that is being lifted by the forklift. The box may be the object, in this example. To determine the stored energy, the potential energy may be calculated (using the mass of the box, the acceleration of gravity, and the height of the box, which may have been determined through the aggregating of the IoT feeds). In this example, the stored energy may correspond to the potential energy. As the box gets lifted higher, the stored energy of the box may increase. There may be historical data stored in the knowledge corpus about potential energy (or stored energy) of boxes being lifted by forklifts and damages caused by the release of the stored energy (e.g., the box breaking, the box falling and harming other individuals, etc.). In some embodiments, the historical data is specific to the warehouse and maybe even the size of the box, depending on the data that has been gathered and stored from previous scenarios.

This data may be used, along with machine learning, to determine an approximate potential energy amount for the box that would not cause damages if the box were to fall, or even an approximate potential energy amount for the box that would likely not cause the box to fall at all. This approximate potential energy amount may be the threshold value of stored energy, in this example. The actual stored, or potential, energy of the box may have been calculated to be 1000 kilojoules (kJ). The threshold value of stored energy may be 10 kJ. Therefore, when comparing the stored energy and the threshold value of stored energy, it may be determined that the stored energy is greater than the threshold value and therefore there is a concerning level of stored energy.

In some embodiments, determining whether there are concerning amounts of stored energy may include determining whether the object, or other nearby objects in the surrounding area, have any safety measures to help contain or prevent damages. If there are safety measures, these safety measures may be factored into the determination of the threshold value of stored energy.

For example, the forklift may have safety measures in place to prevent a box from falling off of the forklift. Specifically, in this example, the forklift may have size limitations for the object being placed on the forklift, and may require that the object be pushed flush against the back of the forklift. In this example, when considering the safety measures, it may be determined that—as long as the box meets the size requirement and is put flush against the back of the forklift—the box may have a stored energy amount of around 1500 kJ before there is a concern of the box to fall off or cause other damages. In this instance, the 1000 kJ actual stored energy amount is less than the threshold value of 1500 kJ, therefore the box may not have a concerning level of stored energy.

If it is determined, in operation 130, that there are not concerning levels of stored energy in the surrounding area, method 100 may end after operation 130. In some instances, if the amount of stored energy in the surrounding area and/or the amount of energy for an object in the surrounding area is not concerning, there may be minimal to no chance of damages/consequences if the stored energy were to be released. Therefore, it may not be necessary to predict potential solutions for consequences due to a release of energy and method 100 may end.

In some instances, method 100 may proceed from operation 120 to operation 140 automatically, without determining whether the levels of stored energy are concerning or high. This way, all stored energy in the surrounding area (for example, the stored energy for each object in the surrounding area) is analyzed and potential solutions for consequences due to a release of the stored energy may be determined for all stored energy in the surroundings, regardless of how concerning the levels of stored energy. This may increase the accuracy of the predictions because every amount of stored energy is considered and used in determining potential consequences due to a release of the stored energy.

If it is determined, in operation 130, that there are concerning levels of stored energy in the surrounding area, method 100 proceeds to operation 140 to predict one or more contextual situations that could result due to a release of the stored energy. The contextual situations may be specific to the surrounding area and/or a specific object in the surrounding area. In some embodiments, the predicted contextual situations are determined by simulating potential effects of the release of the stored energy. In some embodiments, the contextual situations are test cases. For example, predicting one or more contextual situations may include running one or more test cases (for example, via simulation) of stored energy being released in the surrounding area. In some embodiments, the test cases may be run using an augmented reality device. In some embodiments, footage (for instance, achieved via IoT feed) from an augmented reality device may be used for the test cases. In some embodiments, machine learning may be used in order to determine the possible results of stored energy being released in the test cases. For instance, reinforcement learning (a type of machine learning) analyzes data as well as possible outcomes of the data. Reinforcement learning may utilize energy data (from the IoT feeds) and historical data (for example, from the knowledge corpus) and may determine possible outcomes using the data.

In some embodiments, predicting one or more contextual situations (for instance, when using machine learning) includes gathering historical data about damages caused by similar stored energy levels from a knowledge corpus. The historical data may be used to learn and train a machine learning algorithm that predicts the contextual situations. Once the historical data is gathered, the system may then train a machine learning algorithm using the historical data and may use the machine learning algorithm (and the calculated amounts of stored energy (e.g., from operation 120)) to determine potential damages due to a release of the stored energy.

In some embodiments, the knowledge corpus includes historical data such as data pertaining to the surrounding area. The knowledge corpus may also include external data about the surrounding area including at least one of geological data, environmental data, and demographic data.

Method 100 includes operation 150 to determine one or more consequences for each of the one or more contextual situations. Consequences may include any potential harms caused by the release of stored energy. In some embodiments, one or more consequences are determined for each object (or, in some instances, each object with a concerning level of stored energy) in the surrounding area for each of the contextual situations. In some embodiments, the one or more consequences may be determined using machine learning.

In some embodiments, determining the one or more consequences includes executing simulations of each of the one or more contextual situations. The simulations may simulate the steps, or events, that occur once the stored energy is released. In some embodiments, determining the one or more consequences for each of the one or more contextual situations further includes calculating a hazard level for each object in the surrounding area (for each of the contextual situations). The hazard level may indicate a severity of potential consequences for an object due to the release of the stored energy. In some instances, the system may determine one or more consequences of the release of stored energy for each object, and the hazard level may indicate a severity for each of the one or more consequences. The hazard level may be a number, percentage, decimal, range of numbers/percentages/decimals, category, etc. For example, a hazard level may be 8 (i.e., out of 10), 80%, 0.8, etc. In another example, a hazard level may be a range of 70-75% hazardous. In yet another example, a hazard level may be a category such as slightly hazardous, moderately hazardous, highly hazardous, etc. In some embodiments, the higher the hazard level, the more severe (and possibly the more likely) the consequence(s).

In some embodiments, calculating the hazard level for each object in the surrounding area includes determining probable released energy levels for each object. A probable released energy level may be the energy level (or range of energy levels) that is most likely to be released for the object. Put differently, the probable release energy level would correspond to the amount of stored energy that would likely be released if, hypothetically, the stored energy were released for an object. In some embodiments, releasing the stored energy may release all of the stored energy for an object. In some embodiments, only some of the stored energy is released for an object. For example, a box falling off of a shelf would likely release all of the stored energy from the box. In some embodiments, objects near the specific object may also be considered when calculating the hazard level, because stored energy that is released from one object may transfer to another object. For example, a spring may contract (building up stored energy) and then may expand back to its original shape (releasing the stored energy). The spring may be connected to, or at least very close to, another object, and when the spring expands, the stored energy released during expansion may transfer to another object. In some instances, the transfer of the energy to the second object may cause consequences and/or damages.

Calculating the hazard level for each object may also include estimating a duration of impact of the probable released energy levels. Once it is determined how much energy will likely be released, it may be estimated how long the impact due to the released energy levels may last. The duration of impact may help identify how great of an effect the impact will have on the surrounding area and/or objects in the surrounding area. For instance, a high force applied over a short time period (for example due to a collision) may have a high effect and a high force applied over a long time period may have an even higher effect. However, a lower force applied over a longer period of time, even though the duration of the impact may be longer, may have a lower effect on the surrounding area. Therefore, the probable released energy level may be reviewed in conjunction with the duration of impact when determining the hazard level.

Calculating the hazard level for each object may also include estimating potential damages due to the probable released energy levels. Estimating potential damages may include analyzing the duration of impact and the probable released energy levels and determining potential damages using the analysis. In some embodiments, test cases may be run using the probable released energy levels and the duration of impact in order to estimate potential damages.

In some embodiments, calculating the hazard level for each object includes estimating a recovery time. The recovery time may be a time to recover from the potential damages. In some instances, even if the potential damages due to the probable released energy levels may be high, the recovery time due to the damages may be very quick. For example, a pipe may detach from another pipe due to a release of stored energy within the pipe. Even though the pipes may have completely disconnected, repairing the pipes may simply include reattaching them, with no other repairs/replacements needed. Therefore, in this example, the recovery time due to the release of the stored energy may be short. Recovery time may be determined, in some instances, through running the test cases and utilizing machine learning.

In some embodiments, the hazard level is calculated by correlating (and possibly weighting) the various factors (i.e., at least the probable released energy levels, the duration of impact, the potential damages, and the recovery time).

In some embodiments, in response to calculating the hazard level for each object in the surrounding area, determining the one or more consequences for each of the one or more contextual situations may include determining that one or more objects in the surrounding area breach a threshold hazard level. Determining that one or more objects breach a threshold hazard level may include determining that the hazard level for that object breaches a threshold hazard level. The threshold hazard level may be determined using historical data from a knowledge corpus. In some embodiments, the threshold hazard level indicates a maximum, or close to maximum, hazard level that no nominal damages may occur due to the release of stored energy. Therefore, in some embodiments, after the threshold hazard level is achieved and/or breached, there may be a possibility of nominal damages due to the release of stored energy.

In some embodiments, a user may determine the threshold hazard level. For example, some users may want a threshold hazard level of no damages, therefore damages may likely only occur if the threshold hazard level is breached. In another example, for instance when the result of stored energy being released is an earthquake, the user may want the threshold hazard level to be relatively high, so that breaching the threshold of damages may indicate huge potential damages due to the earthquake. An earthquake may have the potential to cause large amounts of damages, so if the threshold hazard level was low, there may be a large amount of potential consequences that breach the threshold hazard level, and therefore the potential consequences that are the most severe could potentially get lost within the large amount of other potential consequences.

In some embodiments, predicting the one or more contextual situations includes determining, for each of the one or more contextual situations, results of the stored energy having been released for at least the one or more objects in the surrounding area that breach the threshold hazard level. The determining may be based on the surrounding area and the one or more objects, in some instances. Once it is determined that the hazard levels, and the corresponding object, may breach the threshold hazard level, it may be determined what happens (i.e., what the results are) for each object that breaches the threshold hazard level when the stored energy is released. For example, returning to the forklift example, a large box being lifted by a forklift may have the potential to fall off the forklift (for instance, when the forklift is at a high height) and may result in hazards that exceed a threshold hazard level (for example, the contents in the box may be destroyed, the box may fall on another object and destroy the other object, the box may fall on a human and harm the human, etc.). Even though the box could have consequences that are far beyond the threshold hazard level, a release of stored energy relating to the box could simply cause the box to shift on the forklift, likely resulting in minimal to no damages to either the box or the forklift, or any other nearby objects. In this example, it may be determined that the results of the stored energy being released for one contextual situation is the box falling off the forklift. In this instance, the box falling off the forklift may breach the threshold hazard level for the box. In other instances, when the contextual situation may result in the box simply shifting on the forklift, the box may not breach the threshold hazard level and, in some instances, this contextual situation may not be considered when determining the consequences for each of the contextual situations.

In some embodiments, determining the one or more consequences for each of the one or more contextual situations is executed on an augmented reality device. The augmented reality device may simulate various test cases and may predict consequences based on the test cases. In some embodiments, determining the one or more consequences is done utilizing an augmented reality device. For example, the data and IoT feeds gathered from an AR device may be used when simulating the various contextual situations and predicting the consequences. In some embodiments, machine learning and artificial intelligence technology is used in order to train the simulation algorithms and continuously improve the predicting and determining.

In some embodiments, method 100 includes determining a probability of occurrence for each of the one or more contextual situations. The probability of occurrence may be a probability that the specific contextual situation may occur. In some embodiments, the probability is indicated by a percentage. In some embodiments, the probability is indicated by a decimal. In some embodiments, determining a probability of occurrences for each of the one or more contextual situations may include determining all possible results for each of the one or more contextual situations. Then, in some embodiments, the results of the stored energy having been released for at least the one or more objects in the surrounding area that breach the threshold hazard level (discussed above) may be compared to total amount of possible results for each of the one or more contextual situations, in order to determine the probability of occurrence.

Method 100 includes operation 160 to calculate a degree of severity of consequences for each of the one or more contextual situations. A degree of severity (indicating how severe or damaging the consequences may be) may be determined for each individual contextual situation. This way, the specific contextual situations that have the potential for higher consequences may be identified and highlighted. In some embodiments, calculating a degree of severity of consequences includes determining the consequence(s) that occur for the specific contextual situation (for example, via simulation, using algorithms determined/formed through machine learning). In some instances, calculating the degree of severity may include comparing the consequence(s) for each specific contextual situation to the consequences for the other contextual situations, such that the degree of severity may indicate the severity of the consequence compared to the other consequences (from the other contextual situations). In some embodiments, a plurality of factors—such as the nature of the consequence(s) for the contextual situation, the extent of the consequence(s), the duration of the consequence(s), etc.—may be considered (and perhaps weighted) when calculating the degree of severity.

The hazard levels for each object may be used to determine the degree of severity, in some instances. In some embodiments, determining the degree of severity of consequences for a contextual situation includes summing up each hazard level for each object in the contextual situation. The sum of the hazard levels may be the degree of severity, in some instances. In some embodiments, the degree of severity is an average of the hazard levels for each object in the contextual situation. In some embodiments, the degree of severity corresponds to the highest hazard level(s) for the contextual situation.

Method 100 includes operation 170 to determine whether the degree of severity indicates that the potential consequences of a release of the stored energy in the surrounding area are severe. In some instances, a threshold severity value may be determined (for example, through machine learning, predetermined by a user, etc.), and any degree of severity that is greater than or equal to the degree of severity may be determined to be severe. For example, the degree of severity may be a number between 1 and 10. Specifically, in this example, the degree of severity may have been determined to be 6. The threshold severity value may be 7, so when comparing the degree of severity to the threshold, it may be determined that the potential consequences for the specific degree of severity (and the specific contextual situation) may not be severe. In some embodiments, the degree of severity may be a category (e.g., mild, moderate, severe, very severe, etc.) and any degrees of severity with the category of severe or very severe may indicate that the potential consequences are severe.

In some embodiments, operation 170 is repeated for each contextual situation and its corresponding degree of severity. A surrounding area may have numerous objects that have stored energy, there may be numerous contextual situations that involve each object and that could potentially occur if the stored energy were to be released. The severity for each contextual situation may need to be considered, in order to determine which contextual situations are most important to prevent. In some embodiments, a threshold severity value is the same for each contextual situation. For example, the threshold severity value may be 7 (or, for instance, a category of severe) for every contextual situation. In some embodiments, the threshold severity value may be unique for each contextual situation. In some embodiments, the threshold severity value may not be unique for every contextual situation, but may be unique for each object. For example, if a box were to fall off of a forklift, the box could come into contact with the floor. Both the box and the floor would be considered an object, but the box may be much easier to damage than the floor, therefore the box may have a lower threshold severity value than the floor.

If it is determined, in operation 170, that the degree of severity for a contextual situation is not severe, method 100 may review the degrees of severity for the other contextual situations, in operation 175, and then return to operation 170 to determine whether the degrees of severity for the other contextual situations are severe. As discussed above, operation 170 may be repeated for each contextual situation. If the degree of severity for a contextual situation is not severe, the degrees of severity for the other contextual situations may be reviewed in order to check whether any of the other contextual situations, and their corresponding degree of severity, are severe.

In some embodiments, if none of the degrees of severity are determined to be severe, method 100 may end after operations 170 and 175 (not depicted).

Returning back to operation 170, if it is determined that the degree of severity for at least one contextual situation is severe, method 100 proceeds to operation 180 to determine one or more proposed solutions based on the degree of severity. In some embodiments, machine learning techniques (such as reinforcement learning) may be used to determine, or predict, one or more proposed solutions. Reinforcement learning may determine actions to be taken in an environment in order to maximize a reward (in this instance, decreasing, or eliminating, the consequences causing the higher degree of severity). Reinforcement learning may be a goal focused algorithm, focusing on the goal of minimizing consequences and learning the best actions possible (i.e., the proposed solution(s)) in order to achieve said goal. In some embodiments, determining the one or more proposed solutions is also based on the probability of occurrence.

In some embodiments, determining the one or more proposed solutions may include running simulations (e.g., AR based simulations) and then, based on the simulation, identifying safe rates of releasing the stored energy such that consequences, or at least sever consequences, may not occur. The proposed solution may include a guide for how to achieve the safe rate of releasing the stored energy. In some embodiments, determining the one or more proposed solutions may include simulating the future effect if the selected solution is applied as a preventative measure. The future effect may be new value(s) of stored energy levels, a rate of change of energy levels of time, etc. In some embodiments, determining the one or more proposed solutions may include personalizing recommendations through dynamic user profile synthesis. In some instances, a user (for example, of the augmented reality device) may set up a user profile before using the device. The user profile may include user preferences for threshold amounts of severity, hazards, etc. Additionally, the user profile may include past data (including energy data) gathered from previous uses of the device by the user.

Method 100 includes operation 190 to transmit recommendation(s) of at least one proposed solution (from the one or more proposed solutions) for implementation. In some embodiments, all proposed solutions determined in operation 180 may be transmitted as recommendations. In some embodiments, only the top proposed solutions (for example, the proposed solutions that result in the least amount of consequences) may be transmitted as recommendations for implementation. In some embodiments, transmitting the recommendation(s) may include simulating (on the AR device) the contextual situation along with the proposed solution. There may be a separate simulation for each transmitted recommendation, in some instances. In some embodiments, transmitting the recommendation may include depicting a predicted future effect if the at least one proposed solution is applied. The predicted future effect may be depicted through an augmented reality device and, in some instances, the future effect may be depicted as a simulation. The simulation may include showing the future effect if the recommended solution is implemented.

Figure 2:
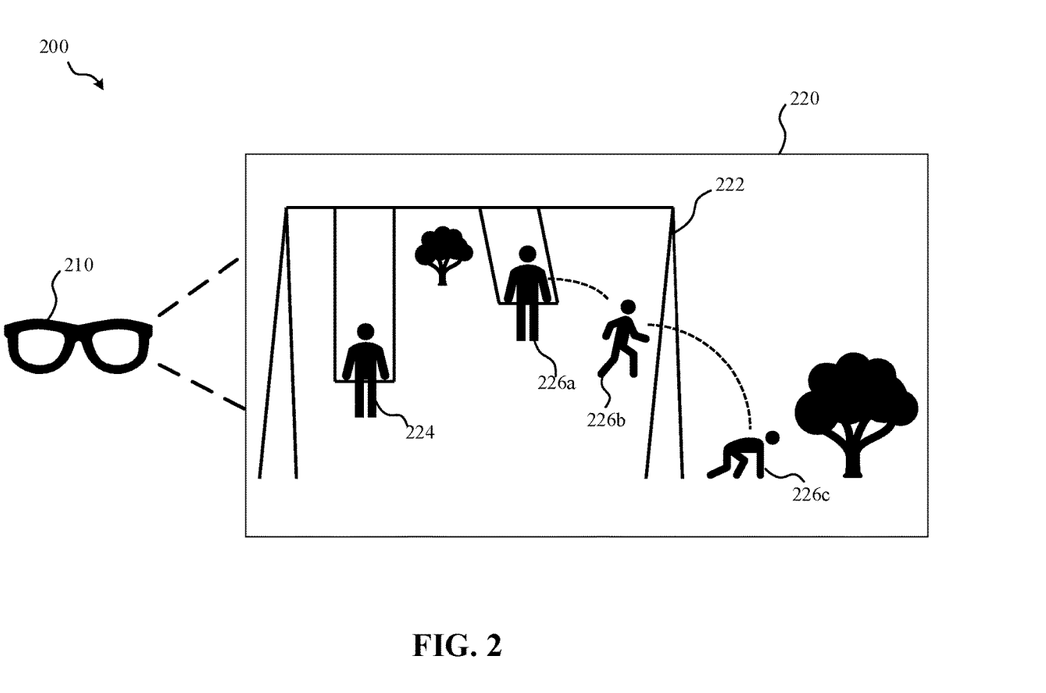
FIG. 2 depicts a schematic diagram of an example augmented reality environment, according to some embodiments.

Referring to FIG. 2, a schematic diagram of an example augmented reality environment 200 is depicted, according to some embodiments. Augmented reality environment 200 includes an AR device 210. In this instance, AR device 210 is a pair of AR glasses, but AR device 210 may be any device with AR capabilities. In some embodiments, AR device 210 is worn by a user (not depicted).

In some embodiments, AR device 210 gathers data about the surrounding area and transmits this data to a computer system (for example, system 300 (FIG. 3) and/or system 400 (FIG. 4)). The data may be transmitted as an IoT feed, and may then be aggregated by the computer system (for example, in operation 110 of FIG. 1). The computer system may then calculate (for example, in operation 120 of FIG. 1) the amount of stored energy in the surrounding area based on at least the data gathered by AR device 210, in some embodiments. In some embodiments, in order to predict one or more contextual situations (for example, in operation 140 of FIG. 1), the computer system may simulate the contextual situations using AR device 210.

As depicted in FIG. 2, the AR device 210 may display an AR simulation 220 of a potential consequence if stored energy is released. In some embodiments, AR simulation 220 is a contextual simulation.

In the surrounding area (as depicted in AR simulation 220), two individuals, person 224 and person 226 are swinging on a swing set 222. In this example surrounding area, the swing that person 226 is using may have a broken string. Using a computer system (e.g., system 300 (FIG. 3) and/or system 400 (FIG. 4)) and method 100 (FIG. 1)), it may be determined that when the string of the becomes taut, it stores potential energy, and when the string loosens, the stored potential energy may release. Based on this determination, the computer system may use the AR device 210 in order to predict, via simulating, a contextual situation of what may occur if the stored energy is released. In the specific AR simulation 220 (i.e., a contextual situation), if the stored energy releases and the string snaps/breaks, person 226 may fall off the swing. Person 226 falling off the swing may be a consequence (for example, as determined in operation 150 of FIG. 1) for the contextual situation of AR simulation 220. AR simulation 220 may depict the potential consequence by showing person 226*a* still on the swing, person 226*b* in midair falling off the swing (after the string loosened), and person 226*c* on the ground after falling off the swing.

In some embodiments, when determining the consequences of the contextual situation depicted in AR simulation 220, the hazard level of person 226 (an object in the surrounding area) may be determined. Falling off a swing may be determined to have a high potential of injury to person 226, so person 226 may have a high hazard level. Additionally, in some embodiments, the overall degree of severity of the contextual situation shown in AR simulation 220 may be determined by the computer system. The degree of severity may be determining using at least the hazard level of person 226, the hazard level of person 224, and the hazard levels of both swings, as they are all objects in the contextual situation of AR simulation 220. In some instances, person 226 may be the only object with a high hazard level, so the degree of severity for the contextual situation of AR simulation 220 may be determined to be severe.

In some embodiments, there may be other contextual situations (not depicted) that may occur if the stored energy is released and the string of the swing loosens. For example, instead of the person 226 falling in the direction depicted in AR simulation 220 (going from position 226*a*, to 226*b*, to 226*c*), person 226 may fall in the direction of person 224. In this contextual situation, both person 226 and person 224 may have high hazard levels, as both person 226 and person 224 may be injured due to the swing loosening and person 226 falling off the swing. For example, person 226 could fall into person 224. Because both person 226 and person 224 may have high hazard levels, the overall degree of severity for this contextual situation (not depicted) may be very severe.

In some embodiments, the AR device 210 may be worn by a user, and the AR simulation 220 may be shown to a user. In some embodiments, (not depicted) AR simulation 220 may also display a potential solution (for example, determined in operation 180 and transmitted to the AR device 210 in operation 190 of FIG. 1) to prevent the simulated consequence for the contextual situation shown in AR simulation 220. For example, it may be determined that if the swing comes down gradually due to gravitational force (as opposed to from the energy exerted by person 226 when pumping their legs while swinging) the stored potential energy may convert to kinetic energy slowly, preventing the swing from loosening. Put differently, having the person stop pumping their legs and simply allowing the gravitational forces to determine the actions of the swing may cause the swing to stop slowly and prevent the person 226 from falling off. AR simulation 220 may display this recommendation to the user of the AR device 210.

Figure 3:
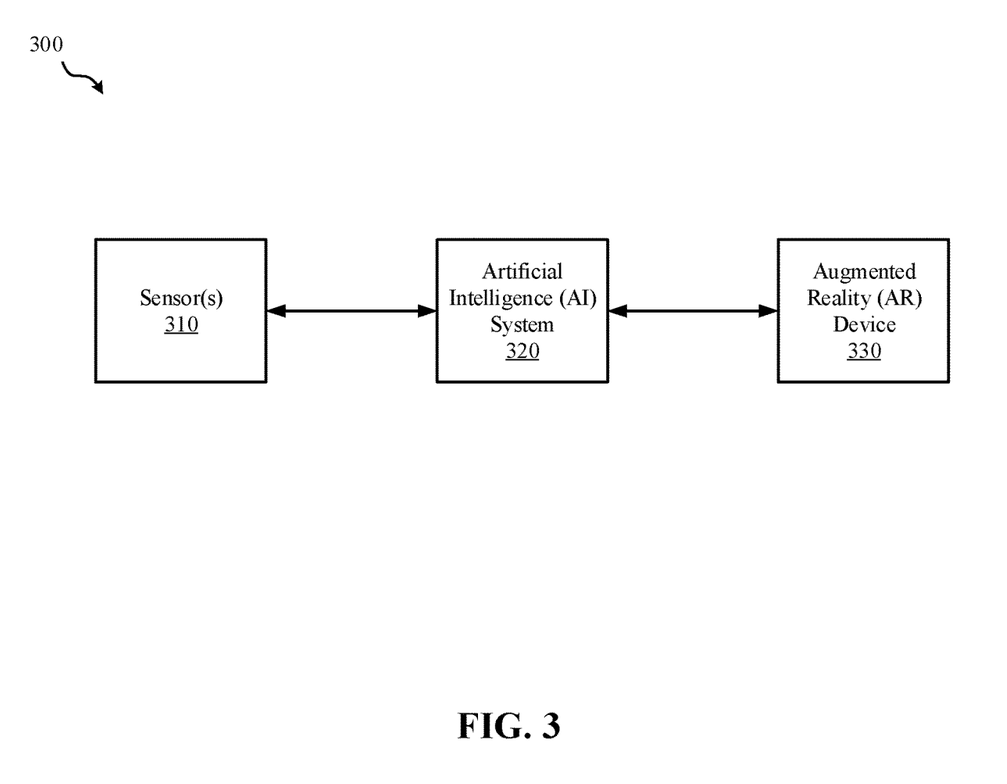
FIG. 3 depicts a block diagram of a first example computer system, according to some embodiments.

Referring to FIG. 3, a block diagram of a first example computer system 300 is depicted, according to some embodiments. In some embodiments, computer system 300 may execute method 100 (FIG. 1). Computer system 300 includes sensor(s) 310, artificial intelligence (AI) system 320, and augmented reality (AR) device 330. In some embodiments, sensor(s) 310 include one or more IoT devices/sensors that are gathering data about a surrounding area. The sensor(s) 310 may transmit IoT feeds to the AI system 320. In some embodiments, AI system 320 performs the operations (i.e., 110-190) of method 100 (FIG. 1). The components of AI system are further discussed herein and depicted in FIG. 4. AI system may be an artificial intelligence system and/or a system with artificial intelligence (e.g., neural network and machine learning) capabilities. In some embodiments, the AI system 320 determines consequences of a release of stored energy and, using machine learning, predicts potential solutions to eliminate, or at least minimize, the potential consequences. The consequences and/or solutions may be transmitted to and simulated on AR device 330, such that a user may be able to see (through AR device 330) a simulation of the consequences of the release of stored energy along with, in some instances, the potential solution(s). An example simulation is discussed herein and depicted in FIG. 2.

Although sensor(s) 310, AI system 320, and AR device 330 are depicted as separate components of system 300 in FIG. 3, these components may be combined in some instances. For example, AR device 330 may be a part of AI system 320.

Figure 4:
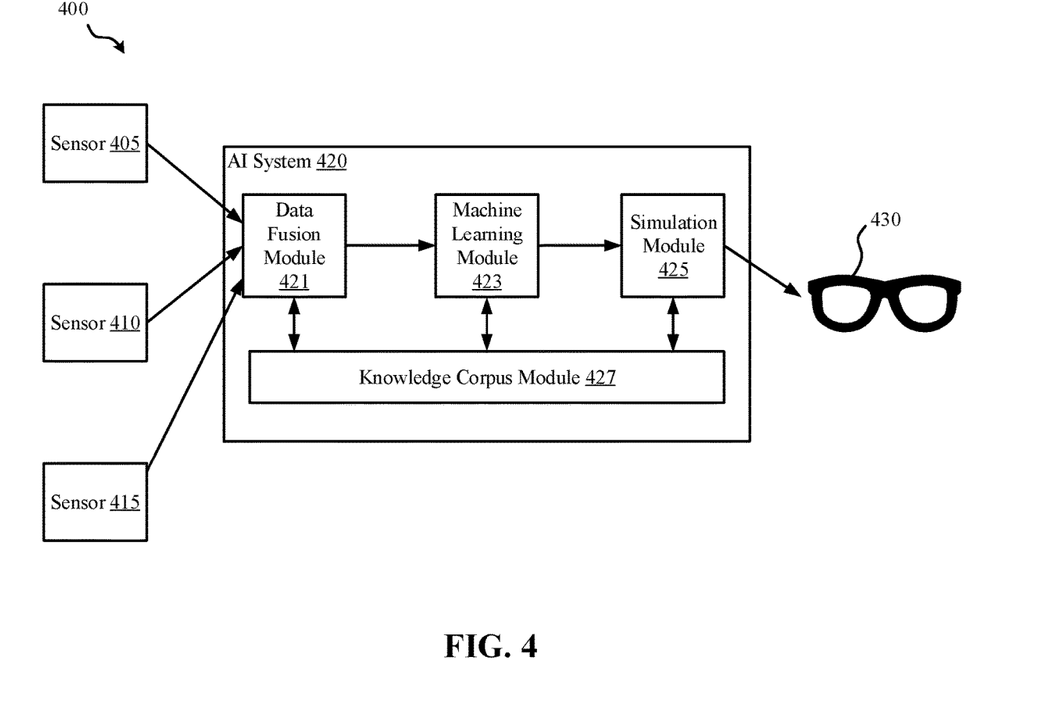
FIG. 4 depicts a schematic diagram of a second example computer system, according to some embodiments.

Referring to FIG. 4, a schematic diagram of a second example computer system 400 is depicted, according to some embodiments. In some embodiments, computer system 400 may perform method 100 (FIG. 1). Computer system 400 includes sensor 405, sensor 410, and sensor 415. Although three sensors are depicted, computer system 400 may include any number of sensors. In some embodiments, sensors 405, 410, and 415 correspond with sensor(s) 210 (FIG. 2).

Computer system 400 includes AI system 420. In some embodiments, AI system 420 corresponds to AI system 320 (FIG. 3). As depicted in FIG. 4, AI system 420 includes a data fusion module 421, a machine learning module 423, a simulation module 425, and a knowledge corpus module 427. Knowledge corpus module 427 may include a knowledge corpus with historical data about stored energy levels, the objects in the surrounding area, damages, etc. In some embodiments, data fusion module 421 performs at least operation 110 (FIG. 1). Data fusion module 421 may receive IoT feeds from the sensors 405, 410, and 415 and may fuse, or aggregate, the IoT feeds. In some embodiments, the data fusion module 421 sends the IoT feeds, or at least a copy of the IoT feeds, to the knowledge corpus.

In some embodiments, the machine learning module 423 performs at least operations 120-175 (FIG. 1). In some embodiments, simulation module 425 (with simulation capabilities) may assist in performing at least some of the operations. Simulation module 423 may receive historical data from the knowledge corpus module 427 and may use the historical data to learn and/or train the machine learning algorithms used in machine learning module 423. For instance, when predicting contextual situations due to a release of stored energy (e.g., operation 140 (FIG. 1)), the machine learning module 423 may gather historical data about damages and events caused by similar stored energy levels from a knowledge corpus in knowledge corpus module 427. The machine learning module 423 may then train a machine learning algorithm using the historical data and may use the machine learning algorithm (and the calculated amounts of stored energy (e.g., from operation 120 (FIG. 1)) to determine potential damages due to a release of the stored energy.

In some embodiments, knowledge corpus module 427 includes historical data such as data pertaining to the surrounding area. The knowledge corpus module 427 may also include external data about the surrounding area including at least one of geological data, environmental data, and demographic data. The historical data may be used by machine learning module 423.

In some embodiments, the machine learning module 423 communicates the results of the machine learning to simulation module 425. Simulation module 425 may perform at least operations 180 and 190 (FIG. 1), in some embodiments. Simulation module 425 may have simulation capabilities and may simulate various test cases and contextual situations. In some embodiments, machine learning module 423 and simulation module 425 are in constant communication, and simulation module 425 may frequently be simulating various potential consequences, etc. as determined by the machine learning module 423.

Computer system 400 further includes AR device 430. In some embodiments, as depicted in FIG. 4, AR device 430 may be a pair of AR glasses. In some embodiments, AR device may be a tablet and/or any other type of mobile/portable device. In some embodiments, simulation module 425 may transmit the simulation to an AR device 430 so that a user is able to see the simulation in augmented reality. FIG. 2 depicts an example AR simulation.

Figure 5:
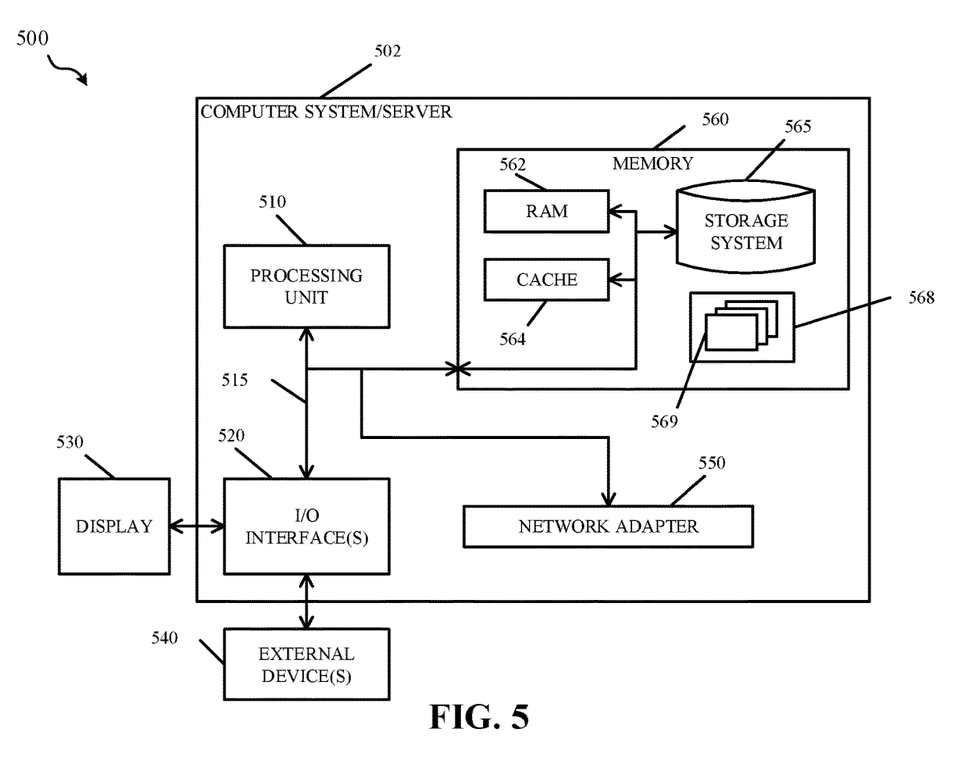
FIG. 5 depicts a block diagram of a sample computer system, according to some embodiments.

Referring to FIG. 5, computer system 500 is a computer system/server 502 is shown in the form of a general-purpose computing device, according to some embodiments. In some embodiments, computer system/server 502 is located on the linking device. In some embodiments, computer system 502 is connected to the linking device. The components of computer system/server 502 may include, but are not limited to, one or more processors or processing units 510, a system memory 560, and a bus 515 that couples various system components including system memory 560 to processor 510.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 560 can include computer system readable media in the form of volatile memory, such as random-access memory (RAM) 562 and/or cache memory 564. Computer system/server 502 may further include other removable/non-removable, volatile/non-volatile computer system storage media. By way of example only, storage system 565 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 560 may include at least one program product having a set (e.g., at least one) of program modules that are configured to carry out the functions of embodiments of the disclosure.

Program/utility 568, having a set (at least one) of program modules 569, may be stored in memory 560 by way of example, and not limitation, as well as an operating system, one or more application programs, other program modules, and program data. Each of the operating system, one or more application programs, other program modules, and program data or some combination thereof, may include an implementation of a networking environment. Program modules 569 generally carry out the functions and/or methodologies of embodiments of the invention as described herein.

Computer system/server 502 may also communicate with one or more external devices 540 such as a keyboard, a pointing device, a display 530, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 520. Still yet, computer system/server 502 can communicate with one or more networks such as a local area network (LAN), a general wide area network (WAN), and/or a public network (e.g., the Internet) via network adapter 550. As depicted, network adapter 550 communicates with the other components of computer system/server 502 via bus 515. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
aggregating IoT feeds from one or more sensors from one or more devices in a surrounding area;
calculating amounts of stored energy in the surrounding area based on the IoT feeds using machine learning techniques to develop an algorithm using various input-output pairs of data from the IoT feeds and the amounts of stored energy;
predicting one or more contextual situations that could result due to a release of the stored energy in the surrounding area by simulating potential effects of the release of the stored energy using an augmented reality device;
determining one or more consequences for each of the one or more contextual situations, wherein the one or more consequences are caused by the one or more contextual situations, wherein determining the one or more consequences comprises:
executing simulations of each of the one or more contextual simulations on the augmented reality device, and calculating a hazard level for each object in a surrounding area for the executed simulations of each of the one or more contextual situations on the augmented reality device;

calculating a degree of severity of the one or more consequences for each of the one or more contextual situations;

determining one or more proposed solutions based on the degree of severity; and transmitting a recommendation of at least one proposed solution, from the one or more proposed solutions, for implementation, wherein the at least one proposed solution is displayed through the augmented reality device.

2. The method of claim 1, wherein predicting the one or more contextual situations that could result due to the release of the stored energy comprises:

gathering historical data about at least events and damages caused by similar stored energy levels from a knowledge corpus;

training a machine learning algorithm using the historical data; and determining potential events caused by a release of the stored energy using the machine learning algorithm and the calculated amounts of stored energy.

3. The method of claim 2, wherein the historical data comprises data pertaining to the surrounding area.

4. The method of claim 3, wherein the historical data further comprises external data including at least one of geological data, environmental data, and demographic data.

5. The method of claim 1, wherein the hazard level indicates a severity of potential consequences for an object due to the release of the stored energy, and wherein determining the one or more consequences for each of the one or more contextual situations further comprises:

in response to the calculating, determining that one or more objects in the surrounding area breach a threshold hazard level; and determining, for each of the one or more contextual situations, results of the stored energy having been released for at least the one or more objects in the surrounding area that breach the threshold hazard level.

6. The method of claim 1, wherein calculating the hazard level for each object in the surrounding area comprises:

determining probable released energy levels for each object;

estimating a duration of impact of the probable released energy levels;

estimating potential damages due to the probable released energy levels; and estimating a recovery time, wherein the recovery time is a time to recover from the potential damages.

7. The method of claim 1, wherein the determining the one or more consequences for each of the one or more contextual situations is executed on an augmented reality device.

8. The method of claim 1, wherein aggregating IoT feeds from the one or more devices in the surrounding area comprises:

receiving one or more IoT feeds from the one or more devices;

analyzing the one or more IoT feeds; and collecting energy data from the one or more IoT feeds.

9. The method of claim 8, wherein:

the one or more IoT feeds are received from an augmented reality device, and the one or more IoT feeds are analyzed using video and image analysis techniques.

10. The method of claim 1, wherein transmitting a recommendation of at least one proposed solution comprises:

depicting a predicted future effect if the at least one proposed solution is applied.

11. The method of claim 10, wherein the predicted future effect is depicted through the augmented reality device.

12. A system having one or more computer processors, the system configured to:

aggregate IoT feeds from one or more sensors from one or more devices in a surrounding area;

calculate amounts of stored energy in the surrounding area based on the IoT feeds using machine learning techniques to develop an algorithm using various input-output pairs of data from the IoT feeds and the amounts of stored energy;

predict one or more contextual situations that could result due to a release of the stored energy in the surrounding area by simulating potential effects of the release of the stored energy using an augmented reality device;

determine one or more consequences for each of the one or more contextual situations, wherein the one or more consequences are caused by the one or more contextual situations wherein determining the one or more consequences comprises:

executing simulations of each of the one or more contextual simulations on the augmented reality device, and calculating a hazard level for each object in a surrounding area for the executed simulations of each of the one or more contextual situations on the augmented reality device;

calculate a degree of severity of the one or more consequences for each of the one or more contextual situations;

determine one or more proposed solutions based on the degree of severity; and transmit a recommendation of at least one proposed solution, from the one or more proposed solutions, for implementation, wherein the at least one proposed solution is displayed through the augmented reality device.

13. The system of claim 12, wherein predicting the one or more contextual situations that could result due to the release of the stored energy comprises:

gathering historical data about at least events and damages caused by similar stored energy levels from a knowledge corpus;

training a machine learning algorithm using the historical data; and determining potential events caused by a release of the stored energy using the machine learning algorithm and the calculated amounts of stored energy.

14. The system of claim 12, wherein the hazard level indicates a severity of potential consequences for an object due to the release of the stored energy, and wherein determining the one or more consequences for each of the one or more contextual situations further comprises:

in response to the calculating, determining that one or more objects in the surrounding area breach a threshold hazard level; and determining, for each of the one or more contextual situations, results of the stored energy having been released for at least the one or more objects in the surrounding area that breach the threshold hazard level.

15. The system of claim 12, wherein calculating the hazard level for each object in the surrounding area comprises:
  determining probable released energy levels for each object;
  estimating a duration of impact of the probable released energy levels;
  estimating potential damages due to the probable released energy levels; and
  estimating a recovery time, wherein the recovery time is a time to recover from the potential damages.

16. The system of claim 12, wherein aggregating IoT feeds from the one or more devices in the surrounding area comprises:
  receiving one or more IoT feeds from the one or more devices;
  analyzing the one or more IoT feeds; and
  collecting energy data from the one or more IoT feeds.

17. A computer program product comprising a computer readable storage medium having program instructions embodied therewith, the program instructions executable by a server to cause the server to perform a method, the method comprising:
  aggregating IoT feeds from one or more sensors from one or more devices in a surrounding area;
  calculating amounts of stored energy in the surrounding area based on the IoT feeds using machine learning techniques to develop an algorithm using various input-output pairs of data from the IoT feeds and the amounts of stored energy;
  predicting one or more contextual situations that could result due to a release of the stored energy in the surrounding area by simulating potential effects of the release of the stored energy using an augmented reality device;
  determining one or more consequences for each of the one or more contextual situations, wherein the one or more consequences are caused by the one or more contextual situations, wherein determining the one or more consequences comprises:
    executing simulations of each of the one or more contextual simulations on the augmented reality device, and
    calculating a hazard level for each object in a surrounding area for the executed simulations of each of the one or more contextual situations on the augmented reality device;
  calculating a degree of severity of the one or more consequences for each of the one or more contextual situations;
  determining one or more proposed solutions based on the degree of severity; and
  transmitting a recommendation of at least one proposed solution, from the one or more proposed solutions, for implementation, wherein the at least one proposed solution is displayed through the augmented reality device.

18. The computer program product of claim 17, wherein predicting the one or more contextual situations that could result due to the release of the stored energy comprises:
  gathering historical data about at least events and damages caused by similar stored energy levels from a knowledge corpus;
  training a machine learning algorithm using the historical data; and
  determining potential events caused by a release of the stored energy using the machine learning algorithm and the calculated amounts of stored energy.

19. The computer program product of claim 17, wherein the hazard level indicates a severity of potential consequences for an object due to the release of the stored energy, and wherein determining the one or more consequences for each of the one or more contextual situations further comprises:
  in response to the calculating, determining that one or more objects in the surrounding area breach a threshold hazard level; and
  determining, for each of the one or more contextual situations, results of the stored energy having been released for at least the one or more objects in the surrounding area that breach the threshold hazard level.

20. The computer program product of claim 17, wherein calculating the hazard level for each object in the surrounding area comprises:
  determining probable released energy levels for each object;
  estimating a duration of impact of the probable released energy levels;
  estimating potential damages due to the probable released energy levels; and
  estimating a recovery time, wherein the recovery time is a time to recover from the potential damages.

* * * * *